(12) United States Patent
Griddaluru

(10) Patent No.: US 11,762,923 B1
(45) Date of Patent: *Sep. 19, 2023

(54) DISPLAYING STYLIZED TEXT SNIPPETS WITH SEARCH ENGINE RESULTS

(71) Applicant: Google LLC, Mountain View, CA (US)

(72) Inventor: Vijayakrishna Griddaluru, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 918 days.

This patent is subject to a terminal disclaimer.

(21) Appl. No.: 16/398,822

(22) Filed: Apr. 30, 2019

Related U.S. Application Data

(63) Continuation of application No. 14/531,358, filed on Nov. 3, 2014, now Pat. No. 10,311,114, which is a continuation of application No. 12/817,362, filed on Jun. 17, 2010, now abandoned.

(51) Int. Cl.
| | |
|---|---|
| *G06F 16/951* | (2019.01) |
| *G06F 16/338* | (2019.01) |
| *G06F 16/9538* | (2019.01) |
| *G06F 16/957* | (2019.01) |
| *G06F 16/955* | (2019.01) |

(52) U.S. Cl.
CPC ............ *G06F 16/951* (2019.01); *G06F 16/338* (2019.01); *G06F 16/9538* (2019.01); *G06F 16/9558* (2019.01); *G06F 16/957* (2019.01)

(58) Field of Classification Search
CPC ... G06F 16/951; G06F 16/2228; G06F 16/248; G06F 16/9535; G06F 16/954; G06F 16/24575; G06F 16/24578; G06F 16/3331; G06F 16/90335; G06F 16/972; G06F 16/957; G06F 16/9558

See application file for complete search history.

(56) References Cited

U.S. PATENT DOCUMENTS

| | | | |
|---|---|---|---|
| 5,873,076 A | 2/1999 | Barr et al. | |
| 8,423,913 B1 | 4/2013 | Hogan et al. | |
| 2004/0268306 A1 | 12/2004 | Cheng et al. | |
| 2005/0117886 A1* | 6/2005 | Kang et al. ............ | G11B 20/10 386/326 |
| 2005/0240576 A1 | 10/2005 | Piscitello et al. | |
| 2006/0069670 A1 | 3/2006 | Khaliq et al. | |
| 2007/0043721 A1 | 2/2007 | Ghemawat et al. | |

(Continued)

OTHER PUBLICATIONS

De Icaza, Miguel. "Farewell to Google's CodeSearch." Nov. 29, 2011 [retrieved on Oct. 8, 2013]. Retrieved from the Internet: <URL: http://tirania.orglblog/archive/2011/Nov-29.html > (6 pages).

(Continued)

*Primary Examiner* — Tamara T Kyle
*Assistant Examiner* — Berhanu Mitiku
(74) *Attorney, Agent, or Firm* — Dority & Manning, P.A.

(57) ABSTRACT

Systems, software, and computer implemented methods can be used to present stylized text snippets with search results received from a search query. A search query is received and at least one web-addressable document responsive to the search query is identified. At least a portion of the text associated with the at least one responsive document and including at least a portion of the search term is retrieved. Further, style information associated with the retrieved portion of text is also retrieved. The style information is then applied to the associated portion of text to create a stylized portion of text associated with the at least one responsive document. A set of search query results including a listing of responsive documents and, for at least one of those documents, a stylized portion of text, is presented.

19 Claims, 7 Drawing Sheets

(56) References Cited

U.S. PATENT DOCUMENTS

| | | | |
|---|---|---|---|
| 2007/0100689 A1* | 5/2007 | Axe et al. | G06Q 30/00 |
| | | | 705/14.5 |
| 2008/0147710 A1 | 6/2008 | Naam et al. | |
| 2008/0301560 A1 | 12/2008 | Rogers et al. | |
| 2009/0226090 A1 | 9/2009 | Okita | |
| 2010/0005060 A1 | 1/2010 | Shebanow | |
| 2011/0035403 A1* | 2/2011 | Ismalon | G06F 16/9535 |
| | | | 707/769 |
| 2011/0107200 A1 | 5/2011 | Rogers et al. | |
| 2011/0208718 A1 | 8/2011 | Tarjan | |

OTHER PUBLICATIONS

Kottke.org. "Google Code Search." Oct. 05, 2006 [retrieved on Oct. 8, 2013]. Retrieved from the Internet <URL: http//kottke.org/06110/google-code-search> (2 pages).

* cited by examiner

US 11,762,923 B1

DISPLAYING STYLIZED TEXT SNIPPETS WITH SEARCH ENGINE RESULTS

CROSS-REFERENCE TO RELATED APPLICATIONS

This application is a continuation of and claims priority to U.S. Application Serial No. 14/531,358, filed on Nov. 3, 2014, which is a continuation of and claims priority to U.S. Application Serial No. 12/817,362, filed on Jun. 17, 2010, the entire contents of which are hereby incorporated by reference.

BACKGROUND

This specification relates to presenting stylized text snippets associated with results from a search engine query.

Search engines allow searching of the Internet for resources, examples of which include web pages, images, video, and audio content. A typical search engine provides a web page for entering search queries. A search query is constructed from terms entered onto a web page by a user, and searches can be conducted for files that relate to the terms in the search query. Results of a search conducted for a particular query are typically ranked and listed on one or more search results web pages.

A basic search results web page can include a list of hyperlinks to web pages, documents, and other files returned with a search. Additionally, the hyperlinks provided on the basic search results web page can include an additional set of information, such as a small portion of text. In some instances, this text can include one or more sentences or other portions of the hyperlinked document, such as portions of the document that include or are associated with at least a portion of the words or terms in the search query. These text snippets are generally presented below or next to the web page or document hyperlink, providing users with a quick view of how the words or terms identified in the search query are included in the text associated with the search results.

SUMMARY

In general, one aspect of the subject matter described in this specification can be embodied in methods that include the actions of i) receiving a search query, ii) identifying at least one web-addressable document responsive to the search query, iii) retrieving at least a portion of text associated with the at least one identified web-addressable document, the retrieved portion of text identified based on the search query, wherein retrieving at least a portion of text associated with at least one identified web-addressable document includes accessing a text index containing text associated with each of the at least one identified web-addressable documents to locate at least one portion of text containing at least a portion of the search query, iv) retrieving style information associated with the retrieved portion of text associated with the at least one web-addressable document, wherein retrieving style information associated with the portion of text associated with the at least one web-addressable document includes accessing a style index containing style information associated with at least a portion of at least one of the at least one identified web-addressable documents, v) applying the retrieved style information to the portion of text associated with the web-addressable document to generate stylized text associated with the at least one web-addressable document, and vi) presenting a set of search query results including a listing of the at least one web-addressable documents responsive to the search query and, for at least one of the web-addressable documents included in the listing, stylized text generated by applying the retrieved style information to text associated with the web-addressable document.

These and other embodiments can each optionally include one or more of the following features, alone or in combination. For example, the search query may includes two or more words. The at least one web-addressable document may include at least one web page, or may be a document selected from the group consisting of an Adobe PDF document, a word processing document, and a spreadsheet. Further, the search query may be received by a search engine, and in some instances, from a client communicably coupled to the search engine. In some instances, the text index is a first index and the style index is a second index. The listing of the at least one web-addressable documents responsive to the search query may include a set of hyperlinks, with each hyperlink associated with one of the at least one web-addressable documents.

Another aspect of the subject matter described in this specification can be embodied in an article comprising a computer readable storage medium, the computer readable storage medium storing instructions for causing one or more processors to perform operations including i) receiving an identification of at least one web-addressable document responsive to a search query, ii) receiving an identification of at least a portion of text associated with the at least one identified web-addressable document, the retrieved portion of text identified based on the search query, wherein receiving an identification of at least a portion of text associated with at least one identified web-addressable document includes accessing a text index containing text associated with each of the at least one identified web-addressable documents to locate at least one portion of text containing at least a portion of the search query, where the text index comprises a first index, iii) retrieving style information associated with the retrieved portion of text associated with the at least one web-addressable document, wherein receiving an identification of style information associated with the portion of text associated with the at least one web-addressable document includes accessing a style index containing style information associated with at least a portion of at least one of the at least one identified web-addressable documents, where the style index comprises a second index separate from the first index, and iv) generating a search results document including a set of search results responsive to the search query, wherein the search results document, when presented on a user interface, displays stylized text associated with the at least one web-addressable document based on applying the retrieved style information to the portion of text associated with the web-addressable document.

These and other embodiments can each optionally include one or more of the following features, alone or in combination. For example, the computer readable storage medium may store additional instructions for causing one or more processors to perform further operations including sending a set of search query results to a client device, the search query results including a listing of the at least one web-addressable documents responsive to the search query and, for at least one of the web-addressable documents included in the listing, stylized text generated by applying the retrieved style information to text associated with the web-addressable document. The search query may include two or more words, and the at least one web-addressable document includes at least one web page. Alternatively, the at least one web-addressable may be a document selected from the group consisting of an Adobe PDF document, a word processing document, and a spreadsheet. In some instances, the search query is received from a remote client device. Receiving an identification of at least a portion of text associated with at least one identified web-addressable document can include accessing a text index containing text associated with each of the at least one identified web-addressable documents to locate at least one portion of text containing at least a portion of the search query, while receiving an identification of style information associated with the portion of text associated with the at least one web-addressable document can include accessing a style index containing style information associated with at least a portion of at least one of the at least one identified web-addressable documents. In some indexes, the text index is a first index and the style index is a second index. Additionally, the listing of the at least one web-addressable documents responsive to the search query includes a set of hyperlinks, with each hyperlink associated with one of the at least one web-addressable documents.

Another aspect of the subject matter described in this specification can be embodied in a system comprising i) one or more search engine servers adapted to receive a search query and identify at least one responsive web-addressable document and retrieve at least a portion of text associated with the at least one identified web-addressable document from a first index, the retrieved portion of text identified based on a search query, ii) one or more stylized text snippet servers adapted to retrieve style information from a second index associated with the retrieved portion of text associated with the at least one web-addressable document and associate the retrieved style information with the portion of text associated with the web-addressable document for use in generating stylized text associated with the at least one web-addressable document, the second index separate from the first index, and iii) one or more search results servers adapted to send a set of search query results to one or more client devices, wherein the set of search query results includes a listing of the at least one web-addressable documents responsive to the search query and, for at least one of the web-addressable documents included in the listing, is adapted to present stylized text generated by applying the retrieved style information to the text associated with the web-addressable document when the set or search query results are presented on a user interface.

These and other embodiments can each optionally include one or more of the following features, alone or in combination. For example, the first index can includes a text index containing text associated with each of the at least one identified web-addressable documents used to locate at least one portion of text containing at least a portion of the search query. Additionally, the second index can include a style index containing style information associated with at least a portion of at least one of the at least one identified web-addressable documents. Further, the listing of the at least one web-addressable documents responsive to the search query includes a set of hyperlinks, with each hyperlink associated with one of the at least one web-addressable documents.

Particular embodiments of the subject matter described in this specification can be implemented so as to realize one or more of the following advantages. One advantage of the subject matter is providing users the ability to view text snippets relevant to a search in their native context. Displaying snippets in the native context can allow users to quickly determine whether the text snippet of a particular search result is a top priority of the linked web-addressable document, or whether the result appears to be information that is not a priority of the document. Additionally, the native context of a text snippet can provide users information on the relative design quality or aesthetics of the web page or other document associated with the text snippet, thereby providing the user with an initial context of the style associated with the result. Further, stylized search snippets as described herein can assist users for recall purposes. If a particular style matches that of a previously-visited web site or web page, that recall can assist a user in assessing the current result in light of the user's experience with the previous page.

The details of one or more embodiments of the present disclosure are set forth in the accompanying drawings and the description below. Other features of the present disclosure will be apparent from the description and drawings, and from the claims.

DETAILED DESCRIPTION

Figure 1:
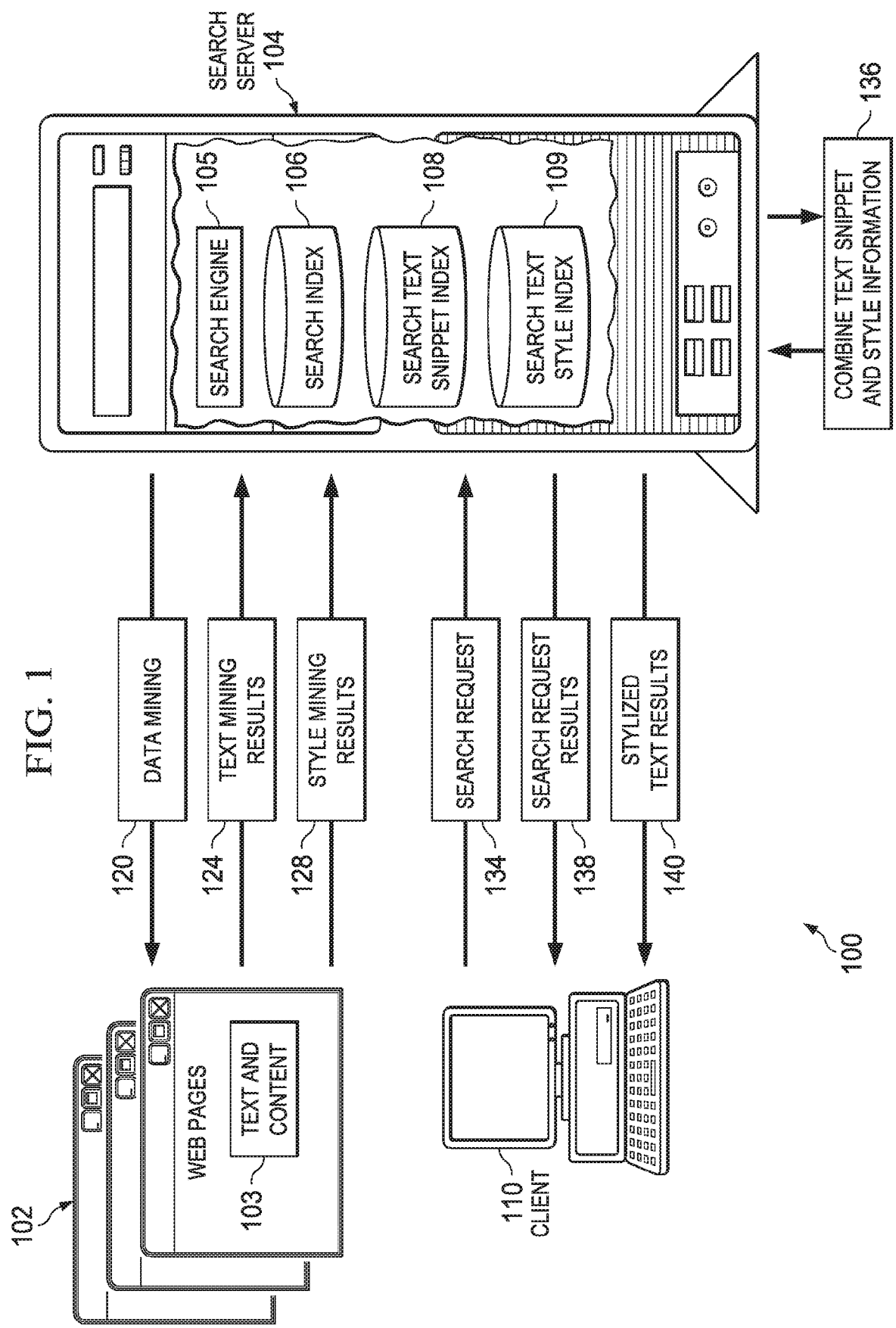
FIG. 1 is a general schematic diagram of a system for storing and presenting text snippets and related style information associated with search results returned from a web search query.

Stylized text snippets of web pages and other documents can be presented with results to one or more search queries. Generally, search engines provide users with the ability to quickly search for and locate documents or other resources associated with one or more search terms of interest. Typical search engine interaction and result pages provide users with a listing of documents and web pages relevant to the search terms, along with hyperlinks and web addresses associated with the results. Such listings are typically organized according to one of any number of ranking and/or sorting algorithms. Additionally, many search engines include portions of text from the individual results identified by the search (also known as "text snippets"). Text snippets can include or specifically relate to at least a portion of the search terms of interest. In many instances, the text snippets may be the most important part of the search results due to the assistance they provide users in differentiating between different listed results. However, text snippets are generally provided in a generic-type style for speed and simplicity, along with, in some instances, bold, highlighting, or some other type of emphasis to identify the specific words or phrases from the text snippet matching those included in the search terms. Thus, even after reading the text snippets, users often elect to visit the web page or electronic document itself to see the search terms and results in their native context.

The techniques described in this specification allow users to view the relevant text snippets in their native context, that is, how the text snippets appear in their native and originating page or document (e.g., with italics, boldface, different text sizing, and the like that appear in the target document). Displaying the text snippets in their native style provides several key advantages to users reviewing search results. First, reviewing text snippets displayed in their native context allows users to quickly access or determine whether a particular search result appears to be interesting, or whether the result appears to be something other than for what the user is looking. For instance, if a text snippet in native form illustrates that a particular search term is included in the top-part of an outline or other document such as a title, menu, or other relevant portion, the user may take notice and choose to visit the search result to continue reading further. In other instances, the text snippet may illustrate that the search term is merely a footnote or other non-essential piece of a web page or document, thus leading the user away from selecting a result. Still further, an overly flashy or otherwise aesthetically unpleasing text snippet may result in the user choosing not to visit the search result. These stylized search snippets may also provide additional assistance to users for recall purposes. For instance, if a particular style matches that of a previously-visited web site or page, a user's recall of the previous page's quality and related information may be used to make the decision as to whether to visit the site or page. If the site was generally unhelpful in the past, the visual cue provided by the stylized text snippet may indicate that further consideration of the search result will likely be unhelpful, or otherwise considered a lower priority than one or more of the other results. Specifically, the stylized text snippet provides users with a focused view of the portions relevant to the search terms by clearly — and in some cases immediately — presenting users with a clear understanding of the search term's importance and relevance to the identified result.

FIG. 1 is a general schematic diagram of a system 100 for storing and presenting text snippets and related style information associated with search results returned from a web search query. Specifically, system 100 includes a client 110, a search server 104, and a plurality of web pages 102 from which search results, text snippets, and style results are retrieved and/or derived. For convenience, the functionality of search server 104, including the associated search engine, is generally illustrated and described as being implemented in a single server. However, as is generally understood in the field of search engines, the functionality of search server 104 is typically distributed among a number of different servers that may perform various different operations and that may be geographically dispersed. In general, system 100 allows users of client 110 to interface with a search engine 105 associated with the search server 104 in order to receive a list of search results corresponding to the user's search query, and, where applicable, a text snippet included in the relevant search result and associated with or including the words or terms of the search query, where the text snippet is formatted according to its style as defined within the particular search result. In some instances, the text snippets provided with the search results can be displayed in the style of their native context, that is, how the text appears in the identified search result.

The system 100 is capable of communications between the various entities through one or more networks, including the Internet. The client 110 may include, among other software and components, a web browser capable of accessing both the search server 104 and one or more web servers that correspond to the plurality of web pages 102. Each of the plurality of web pages 102 may also include various sets of text and content 103, including hypertext markup language (HTML) documents, Adobe PDF documents, multimedia links, and other items or documents suitable for inclusion in a web page. Additionally, each web page may itself be a document other than web page, such as an Adobe PDF document, a word processing document, a spreadsheet, a database, or other document associated with a defined uniform resource locator (URL) or other web-addressable location accessible to either or both of the client 110 or the search server 104. The search server 104 is a web-based server accessible to clients 110 and capable of communicating with web servers that store the plurality of web pages 102. Further, the illustrated search server 104 includes a search engine 105 capable of receiving search requests and performing searches based on user input received from the client 110, as well as retrieving text and content 103 from the plurality of web pages 102 for storage and indexing. The search server 104 includes a search index 106 containing indexed information about the plurality of web pages 102 used to respond to user search queries and/or requests, a search text snippet index 108 containing information identifying the text included within one or more of the plurality of web pages 102, and a search text style index 109 storing style information associated with the text of the search text snippet index 108. The style information of the search text style index 109 may be associated with text stored in the search text snippet index 108 to allow the search engine 105 to quickly identify and apply the appropriate style to text snippets relevant to the search results identified in response to the user's search query. In some implementations, text snippets may be constructed or identified based on the search index 106 instead of implementing a separate search text snippet index 108.

Several processes associated with providing stylized search snippets to users with their search results are shown in FIG. 1. As shown by arrow 120, the search server 104 (or the search engine 105) accesses one or more of the plurality of web pages 102 to perform data mining operations related to the search engine 105. For example, these data mining operations may include any relevant type of web page indexing and analysis, including, but not limited to, storing and indexing web page information, such as the web page's text and content 103, as well as determining a rank of the page according to one or more predefined ranking algorithms. In response to the data mining operations, arrows 124 and 128 illustrate that in addition to basic web page information, the search server 104 (and search engine 105) retrieve text and style results associated with the text and content 103 of the particular web pages 102 accessed and analyzed at 120. The text mining results returned at arrow 124 may include the entire textual content of a particular web page or set of web pages, or only certain portions relevant to search engine indexing. As illustrated in FIG. 1, the text mining results are stored in the search text snippet index 108 of the search server 104. Further, the returned style mining results (as illustrated by arrow 128) may include information on the relevant style or styles applied to the textual content of the particular web page or set of web pages for which information was returned at arrow 124. As illustrated in FIG. 1, the style mining results are stored in the search text style index 109 of the search server 104 as information is received. In some instances, the search text snippet index 108 and the search text style index 109 may be combined in a single index storing the textual and stylistic information in a single location. In other instances, including the specific implementation illustrated in FIG. 1, text and style information may be stored separately. When stored separately, the search server 104 (and/or the search engine 105) may store data linking the text content of the search text snippet index 108 with the related styles stored in the search text style index 109 to allow for stylized text snippets to be generated when results are returned to a user. Further, although illustrated as stored in a single server, each of the search index 106, search text snippet index 108, and/or the search text style index 109, or a portion thereof, would typically be stored on multiple databases external to the search server 104, and made accessible for purposes of providing stylized search results via one or more networks.

Once the relevant information is obtained by the search server 104, a client 110 may access a web page associated with the search engine 105. One example search engine is the Google™ search engine provided by Google Inc. of Mountain View, California, U.S.A. Using the basic web search page associated with the particular search engine 105, a user associated with the client 110 may type in one or more search terms and submit the search query to the search engine 105 (as shown by arrow 134). The search engine 105 then identifies one or more search results (i.e., web pages, documents, or other items included within the search index 106) to return to the client 110 and present to the user. Additionally, the search engine 105 determines one or more relevant portions of text included with each identified search results from the search text snippet index 108 to include with the listing of search results. These portions of text (or text snippets) are generally related to and/or include the search terms submitted with the search query, and can provide the user with an idea of where in the identified result the search terms are located.

Next, or concurrently, the search engine 105 identifies the style information associated with the identified text snippets, and, as illustrated by arrow 136, combines the text snippet and appropriate style information to generate the stylized text portion to be returned with the list of identified search results presented to the user. Arrow 138 illustrates the search server 104 sending the identified search results to the client 110, and arrow 140 illustrates the search server 104 providing the client 110 with the stylized text results associated with the identified search results. In most instances, the search results and the stylized text snippets are formatted and prepared at the search server 104 (e.g., by the search engine 105), and are provided to the client 110 in one transaction. In others, the list of search results may be provided first, with the stylized text snippets being provided thereafter, either once the stylized results are completed or based on some user indication or selection, such as an explicit request for stylized search results or text results in general, or by a user action (e.g., mousing over a particular entry in the list of identified search results). In still other instances, a plain text version of the relevant text snippets may be first sent to the client 110, with a stylized version sent either after a user's request for the stylized version or automatically once the search engine 105 identifies and combines the plain text snippet with the appropriate style information. By sending the plain text snippet first, the results may be provided sooner to the client 110, reducing the amount of time until search results can be viewed. In some instances, the time between providing a plain text snippet and a stylized text snippet may be such that the performance of the system can be increased by using dynamic components and programming techniques to quickly provide the initial search results and text snippet, and subsequently updating the generic text snippet as the user reviews the results or requests to view the text snippet in its stylized embodiment.

Figure 2:
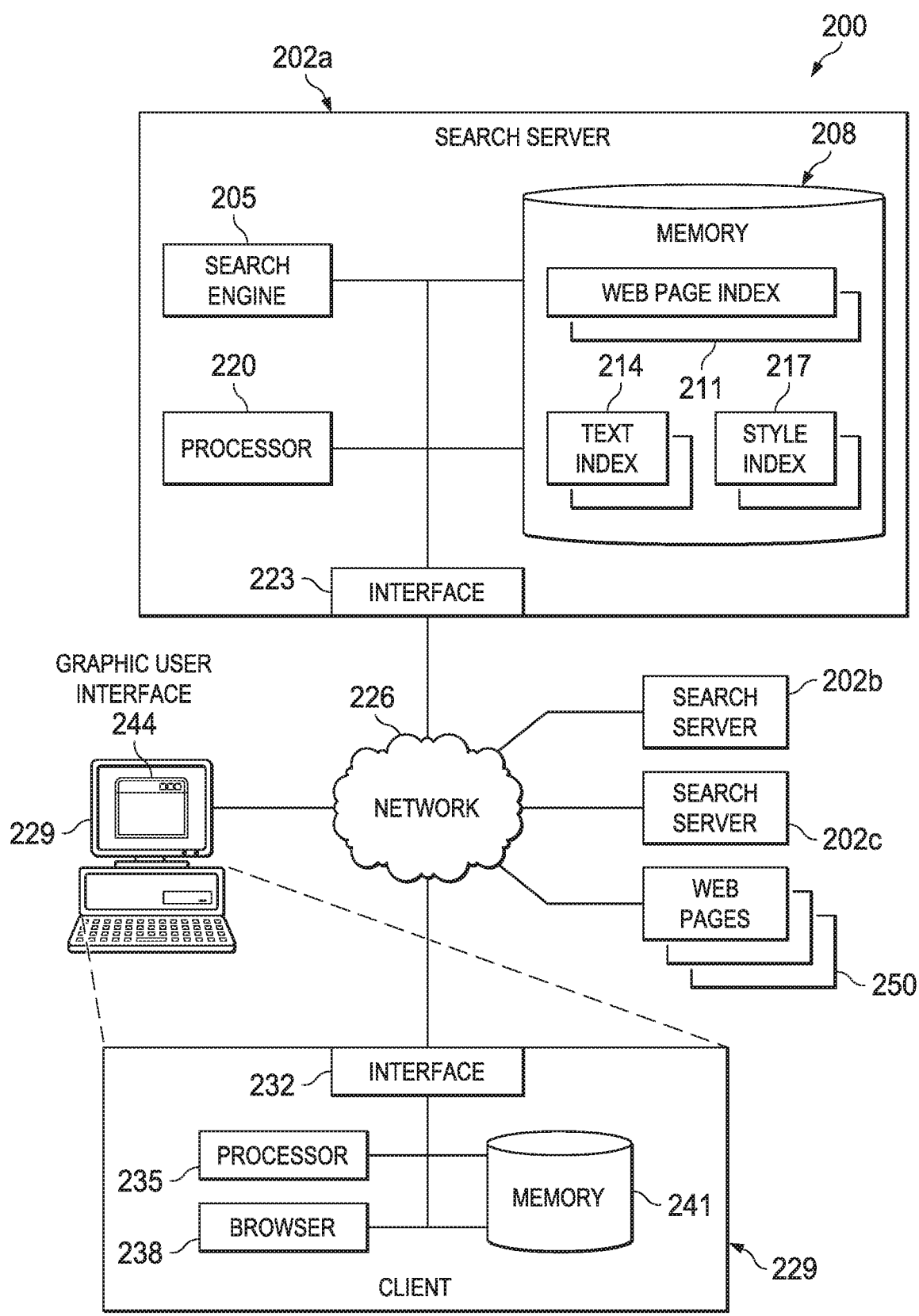
FIG. 2 is a block diagram illustrating an example configuration of a system for storing and presenting text snippets and related style information associated with search results returned in response to a search query.

FIG. 2 is a block diagram illustrating an example configuration of a system 200 for storing and presenting text snippets and related style information associated with search results returned in response to a search query. As shown, system 200 includes, or is communicably coupled with, one or more search servers 202a, a client 229, a network 226, and a plurality of web servers storing web pages 250. The client 229 is capable of sending, via the network 226, one or more search queries to the search engine 205 of search server 202a. In response to the query, the search server 202a (and particularly, its search engine 205) transmits at least one set of search results, along with stylized text snippets, back to the client 229.

The search server 202a (as well as search servers 202b and 202c) may include a processor 220, a memory 208, an interface 223, and the search engine 205. In general, each server 202 may be an electronic computer device operable to receive, transmit, process, store, or manage data associated with the system 200. The search server 202 of system 200 may be implemented using computers other than servers, as well as a server pool. Further, search server 202 may be adapted or operable to execute any operating system including Linux, UNIX, Windows, Mac OS X, or any other suitable operating system.

The search server 202a includes the processor 220. The processor 220 executes instructions and manipulates data to perform the operations of the search server 202a, and may be implemented as, for example, a central processing unit (CPU), a blade, an application specific integrated circuit (ASIC), or a field-programmable gate array (FPGA), among others. Although illustrated as a single processor, multiple processors 220 may be used in some implementations. In FIG. 2, processor 220 executes the operations necessary to support the search engine 205. Specifically, the search engine 205 may be accessed across network 226 from multiple client devices (although only client 229 is illustrated in FIG. 2), each of which may be located locally or remotely from the search server 202a. The search engine 205 may be accessed by the client device 229 and other devices to perform searches for web pages, documents, or other files available from the server 202a, from other servers (202b or 202c) accessible through network 226, or through other networks or connections (not shown). In some implementations, the search engine 205 may be supported by multiple servers in, for example, a distributed server architecture.

In addition to performing searches, the search engine 205 (or another component related to the search engine 205) can perform indexing operations on the plurality of web pages 250, analyzing the various web pages using data mining techniques and creating various indexes stored in memory 208. The memory 208 of the search server 202a may include any memory or database module and may take the form of volatile or non-volatile memory including, without limitation, magnetic media, optical media, random access memory (RAM), read-only memory (ROM), removable media, or any other suitable local or remote memory component. For example, memory 208 may store indexes, classes, applications, backup data, jobs, parameters, cookies, variables, algorithms, instructions, rules, or references thereto.

Illustrated memory 208 includes a web page index 211, a text index 214, and a style index 217. Although illustrated within memory 208, some or all of the items may be located external to memory 208 and/or server 202a in some implementations (e.g., in multiple different memories or multiple different servers, such as additional or alternative indexes stored at search servers 202b and/or 202c, as well as other locations). In the present example of system 200, the web page index 211 generally stores information relevant to identifying one or more web pages or web-addressable documents that has been analyzed and indexed by the search engine 205. When the search engine 205 receives search queries from a client 229, the search engine 205 can access the web page index 211 to determine which previously-analyzed web pages 250 best meet the parameters, search terms, and other elements of the search query.

Additionally, memory 208 includes a text index 214 storing at least a portion of the text contained within each of the plurality of web pages 250 analyzed by the search engine 205. The text information stored in the text index 214 can be used to provide text snippets along with the search results generated by the search engine 205, and specifically, to provide an indication of the textual context where various portions of the search terms are located in the identified search results (i.e., a sentence or paragraph where the specified search terms are included from the identified search result).

The third component illustrated in memory 208, the style index 217, stores style information associated with the various sets of text stored in the text index 214. When the search engine 205 analyzes and retrieves the text contained in particular web pages 250, it also retrieves the style information defined in the web page or document, such as markup information associated with the text, formatting information associated with the document, and other native style information retrievable from the web page or document. This information can be used when responding to a search query to provide a user with a stylized text snippet provided in the web page or web-addressable document's native format, thus providing the user with an immediate understanding of both the textual and stylistic context of the search terms from the search query. The search engine 205 can associate text stored in the text index 214 and style information stored in the style index 217 so that the search engine 205 can cross-reference the style index 217 once results and relevant text snippets have been identified. In some instances, this may include adding specific identifiers, such as foreign keys or unique addressing, that allow a particular portion of text to be associated with a specific style from originating web page. In some implementations, style information may be also be stored in the text index 214, such that the text index 214 and the style index 217 are combined into a single index containing both the text related to the items in the web page index 211 and the style information associated with that text.

When a set of results (i.e., a set of web pages and documents) are identified by the search engine 205 as responsive to a particular query, the search engine 205 identifies the relevant text from the text index 214 to determine the particular text snippet is to be provided with the search result. Once the relevant text snippet is selected, the search engine 205 can identify the style or styles relevant to the text snippet from the style index 217, and subsequently combine the text snippet and style information to generate the stylized text snippet. While the stylized text snippet generally will be associated with a single style, some text snippets may include two or more styles, each of which can be applied to the text snippet to create a stylized text snippet containing two or more distinct styles within one text snippet. When multiple styles are present in a particular text snippet, a generic text snippet provides no distinction between the different styles and portions of text. When multiple styles are applied to a text snippet, however, the different styles provide visual cues to a user regarding the relative location and importance of particular portions of the text snippet. For instance, when one or more of the search terms associated with the query appear in different portions of the search result, a stylized search result of two or more styles can indicate to the user/searcher that the search terms are scattered among discordant styles in the result page rather than provided together in a single location and/or homogenous style. Conversely, if the search terms have an inherent grouping that cannot be adequately expressed when the search terms are submitted (such as via a text box provided in a search engine web interface), the different (or in some cases, similar) styles provided by the stylized text snippet can emphasize or illustrate the distinction between the various text, thus allowing for a more informed selection by the user/searcher. In some instances, the stylized text snippet is included with the set of search results identified by the search engine 205, and presented to the user at client 229.

The search server 202a also includes interface 223 for communicating with other computer systems, search servers (e.g., search server 202b and 202c), clients 229, and web pages 250 over network 226. Generally, interface 223 comprises logic encoded in software and/or hardware in a suitable combination operable to communicate with the network 226. More specifically, interface 223 may comprise software supporting one or more communication protocols such that the network 226 or hardware is operable to communicate physical signals.

The network 226 facilitates wireless or wireline communication between the search server 202a and any other local or remote computer, including one or more clients 229 in the system 200. Indeed, while illustrated as a single network, network 226 may be a discontinuous network, so long as at least a portion of the network 226 may facilitate communications between senders and recipients. An example wireless link may be provided via 802.11a/b/g, 802.20, WiMax, or other types of wireless links. The network 226 can encompass any internal or external network, networks, sub-network, or combination thereof operable to facilitate communications between various computing components inside and outside the illustrated system 200. The network 226 may communicate, for example, Internet Protocol (IP) packets, Frame Relay frames, Asynchronous Transfer Mode (ATM) cells, voice, video, data, and other suitable information between network addresses. The network 226 may include one or more local area networks (LANs), radio access networks (RANs), metropolitan area networks (MANs), wide area networks (WANs), all or a portion of the Internet, one or more wireless phone networks, and/or any other communication system or systems at one or more locations.

The illustrated environment of FIG. 2 also includes one or more clients 229. Each client 229 is any computing device operable to connect or communicate at least with the search server 202a and/or the network 226 using a wireline or wireless connection. Further, each client 229 includes a processor 235, an interface 232, a web browser application 238, a graphical user interface (GUI) 244, and a memory 241. In general, the client 229 comprises an electronic computing device operable to receive, transmit, process, and store any appropriate data associated with the environment 200 of FIG. 2. It will be understood that there may be any number of clients 229 associated with environment 200, as well as any number of clients 229 external to environment 200. For example, while illustrated environment 200 of FIG. 2 includes only a single client 229, alternative implementations of environment 200 may include two or more clients communicably coupled to the search server 202a (or to search servers 202b and/or 202c). There may also be one or more additional clients 229 external to the illustrated portion of environment 200 that are capable of interacting with the environment 200 via the network 226. Further, the term "client" and "user" may be used interchangeably as appropriate without departing from the scope of this disclosure. Moreover, while each client 229 is described in terms of being used by one user, this disclosure contemplates that many users may use one computer or that one user may use multiple computers. As used in this disclosure, client 229 is intended to encompass a personal computer, touch screen terminal, workstation, network computer, kiosk, wireless data port, smart phone, personal data assistant (PDA), one or more processors within these or other devices, or any other suitable processing device. For example, each client 229 may comprise a computer that includes an input device, such as a keypad, touch screen, mouse, or other device that can accept information, and an output device that conveys information associated with the operation of the search server 202a or the client 229, including digital data, visual information, or the GUI 244. Both the input device and the output device may include fixed or removable storage media such as a magnetic computer disk, CD-ROM, or other suitable media to both receive input from and provide output to users of the client 229 through the display, namely the GUI 244.

The interface 232 of the client 229 may be similar to interface 223 of the search server 202a in that it may include logic encoded in software and/or hardware in a suitable combination and operable to communicate with the network 226. More specifically, interface 232 may include software supporting one or more communication protocols such that the network 226 or hardware is operable to communicate physical signals to and from the client 229.

Similarly, memory 241 of the client 229 may be similar to memory 208 of the search server 202a, and may include any memory or database module and take the form of volatile or non-volatile memory including, without limitation, magnetic media, optical media, random access memory (RAM), read-only memory (ROM), removable media, or any other suitable local or remote memory component. For example, memory 241 may store backup data, parameters, cookies, variables, algorithms, instructions, rules, or references thereto, as well as any other suitable data.

The GUI 244 is a graphical user interface capable of displaying a visual representation of search results provided to the client 229 by the search engine 205 in response to a query sent from the client 229, as well as to allow users at each client 229 to view those visual representations. Generally, the GUI 244 provides users with an efficient and user-friendly presentation of data provided by or communicated within the system. The term "graphical user interface," or GUI, may be used in the singular or in the plural to describe one or more graphical user interfaces and each of the displays of a particular graphical user interface. Therefore, the GUI 244 can be any graphical user interface, such as a web browser, touch screen, or command line interface (CLI) that processes information in the environment 200 and efficiently presents the results to the user. In general, the GUI 244 may include a plurality of user interface (UI) elements such as interactive fields, pull-down lists, and buttons operable by the user at the client 229. These UI elements may be related to the functions of one or more applications executing at the client 229, such as a business application or the web browser associated with the GUI 244. In particular, the GUI 244 may be used in connection with the web browser 238 associated with the GUI 244 to view and navigate to various web pages, some of which may be associated with (or the visual representation of) the plurality of web pages 250 associated with network 226 and identified by the search engine 205 (as illustrated in FIG. 2). For purposes of the present specification, the term "web browser" and "GUI" may be used interchangeably, such that the GUI 244 may be referred to as the "web browser 238."

In some instances, the GUI 244 (or the web browser 238) is a software application that enables the client 229 (or a user thereof) to display and interact with text, images, videos, music, and other multimedia files and information typically located in web page files received from one or more web servers (e.g., search server 202a, or information from web servers hosting one or more of the plurality of web pages 250), or other computers accessible via the network 226. Additionally, the GUI 244 (or web browser 238) allows the client 229 to present a search engine web page associated with the search engine 205 that allows the client 229 to submit web search queries, as well as to present the results identified by the search engine 205 associated with those web search queries. Text and images embedded within web pages displayed by the web browser 238 can contain hyperlinks (or other logical network addresses) to other web pages, with some of those web pages associated with different web servers and domains than the web page containing the hyperlink (e.g., the list of hyperlinks to various web pages identified by the search engine 205). Users of client 229 can quickly and easily access information associated with the various web pages by navigating those links using the web browser 238. In general, the web browser 238 formats web pages stored as HTML documents, XHTML documents, text files, or any other suitable files for display via the GUI 244, so the visual appearance of a particular web page 250 may differ between various types of browsers. As illustrated in FIG. 2, the web browser 238 can connect to the search engine 205 and web pages 250 via the network 226. Example web browsers 238 may include Microsoft's Internet Explorer, Mozilla's Firefox, Apple's Safari, Opera Software ASA's Opera browser, and Google's Chrome, as well as any other suitable browser. In certain implementations, the web browser 238 may be associated with, or may be a portion or module of, a business application, providing web browser or similar web page processing and visualization functionality to the application.

While FIG. 2 is described as containing or being associated with a plurality of components, not all components illustrated within the illustrated implementation of FIG. 2 may be utilized in each alternative implementation of the present disclosure. Additionally, one or more of the components described herein may be located external to environment 200, while in other instances, certain components may be included within or as a portion of one or more of the other described components, as well as other components not described. Further, certain components illustrated in FIG. 2 may be combined with other components, as well as used for alternative or additional purposes in addition to those purposes described herein.

Figure 3:
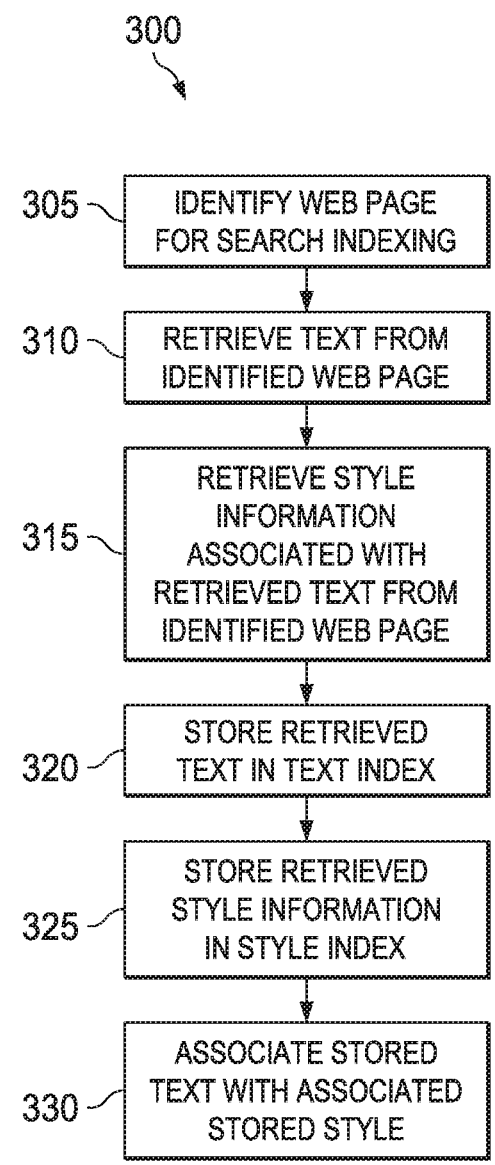
FIG. 3 is a flowchart illustrating a method for retrieving and storing text snippet and style information from a web page.

FIG. 3 is a flowchart illustrating a method 300 for retrieving and storing text snippet and style information from a web page. For clarity of presentation, the description of method 300 that follows references environment 200 illustrated in FIG. 2 for example elements that may perform one or more of the described operations. However, it will be understood that method 300 may be performed, for example, by any other suitable system, environment, or combination of systems and environments as appropriate.

At 305, a web page (or suitable web-addressable document) is identified for search indexing. In some instances, the web page is identified by a search engine during routine data mining and indexing procedures. For example, search engine 205 of FIG. 2 may identify one of the plurality of web pages 250 as a web page to be analyzed and indexed for future searches. Additionally, the identified web page may have never been indexed previously, while in others, the operations of 305 are merely meant to update a set of indexing information previously analyzed and stored for the identified web page. Any number of suitable web indexing and analysis techniques may be used in association with method 300, and additional techniques and operations not explicitly described here may be used as appropriate to provide a complete and accurate analysis of each identified web page.

At 310, the search engine retrieves at least a portion of the relevant text from the identified web page. In some instances, the search engine may retrieve all text contained within a web page, while in others, only a selected portion of the text will be retrieved. Text retrieval can be performed via screen-scraping, analysis of a page's source code, or through optical character recognition (OCR), as well as any other suitable method. At 315, the search engine retrieves the style information associated with the retrieved text from the identified web page. Style information will generally only be retrieved for the portions of text retrieved at 310. In some instances, the search engine may use the source code of the web page, along with any related style definitions (i.e., specific text markup in an HTML or other markup document) or style sheets (i.e., a cascading style sheet (CSS) defining the particular style of a page, along with the particular tags or other style definitions associated with the page's CSS), to identify and retrieve the appropriate formatting. Alternatively, specific programs capable of determining, analyzing, and/or defining the particular style of a web page may be used. For instance, in documents using a proprietary or generally non-standard-conforming style, a substitute or alternative style definition may be defined that is compatible with all browsers, or at least those browsers unable to process or display the analyzed style information associated with the native web page. In still other instances, an image or screenshot from the page, along with OCR techniques, may be used to capture the appropriate style information for the text. In general, any suitable technique, process, or software may be used to identify and retrieve the style information associated with the text retrieved at 310.

At 320, the retrieved text is stored in a text index and associated with the identified web page. At 325, the retrieved style information is stored in a style index. Further, at 330, the stored text information is associated with the stored style information to allow for cross-referencing or identification of the appropriate style for a portion of text used in returning results at a later time. In some instances this association may be based on an explicit connection between certain text entries in the text index and certain style entries in the style index. For example, a unique style ID value may be assigned to a portion of the text in the text index, where the unique style ID refers to a particular entry in the style index. Other suitable methods of associating the stored text from a web page with the stored style information may be used, and any suitable method or process providing the ability to correctly apply the style information to a portion of text identified for inclusion with search results may be used.

Figure 4:
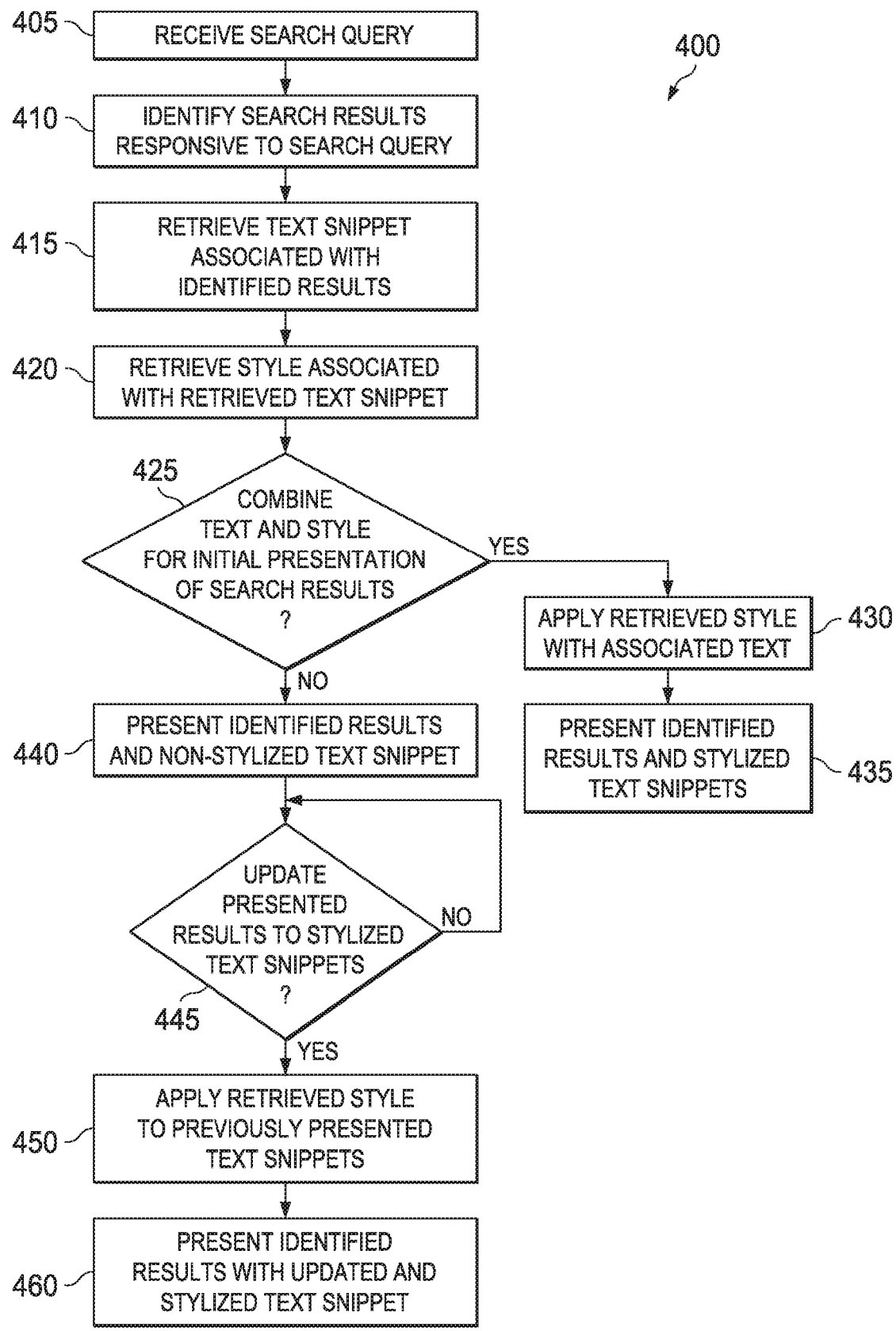
FIG. 4 is a flowchart illustrating a method for presenting text snippets and related style information associated with search results returned from a web search query.

FIG. 4 is a flowchart illustrating a method 400 for presenting text snippets and related style information associated with search results returned from a web search query. Method 400 may be performed, for example, by a system such as the systems 100 and 200, but for clarity of presentation, the description that follows uses system 200 as a particular example for describing the method steps. However, another suitable system or combination of systems may be used to perform method 400 in alternative implementations.

At 405, a search query is received. In some implementations, the search query is received at a search server and/or by a search engine associated with a web page. The search query may generally be represented as a set of words, terms, or phrases entered by a user at a client interacting with the web page front-end of the search engine. The search query may further be a hypertext transfer protocol (HTTP) request received from a browser associated with a client, such as browser 238 of client 229.

At 410, search results (i.e., particular web pages, documents, or other search engine-accessible documents) responsive to the search query are identified. In some instances, the search results may be determined based on a known or proprietary ranking algorithm used by a particular search engine to determine the appropriate items responsive to the search. Additionally, certain search engines may be capable of identifying various types of documents, including static web pages, dynamic web pages, web-addressable documents, and multimedia files in response to the search. Still further, the search query may include particular limitations or parameters defining what types of documents are to be included in the search results. A search engine identifying the search results may filter out results not meeting the criteria defined in the search query after results are identified, or the search engine may not search certain repositories or indexes based upon the predefined criteria. As illustrated in FIG. 2, results are identified by the search engine 205 from the web page index 211 based on the results of the search engine's analysis.

At 415, a text snippet associated with each, or at least a portion, of the identified results is retrieved or identified. For example, after identifying a particular web page as responsive to the query, a search engine may review entries in a text index associated with the particular web page to select one or more sentences or portions of sentences containing some or all of the words or phrases included in the search query for inclusion with the identified search results. In some instances, the search engine may identify a sentence that includes a complete phrase recited in the search query, while in other instances, the search engine may identify portions of several sentences containing or related to at least one of the submitted search terms, words, or phrases. Additionally, for some results, such as multimedia files without associated text, no text snippet may be identifiable. In those instances, the search engine may continue to the next identified search result to determine the appropriate text snippet to include when presenting the results.

At 420, the style associated with the identified text snippet or snippets is identified and retrieved. As described in method 300, the association between a particular portion of stored text and the stored set of style information may be based upon entries in the related indices storing such information. For example, the relevant text may be associated with a unique identifier or ID related to a style index. By comparing the unique identifier associated with the identified text snippet to the appropriate record, file, or other entry in the style index, the search engine can quickly and efficiently identify and retrieve the appropriate style information associated with the retrieved text snippet or snippets. In some instances, particularly where more than one sentence or portion of text is identified as the relevant text snippet, more than one style may be identified and retrieved. In these instances, the search engine may be capable of determining which portion of the retrieved text is associated with which style information, and perform the later operations accordingly.

At 425, method 400, or a search engine performing the operations of method 400, determines whether to combine the retrieved sets of style information (from 420) with the retrieved text snippets (from 415). In some instances, this determination may be based on one or more explicit settings defined for the user or client that sent the initial search request at 405. For example, a user profile may include specific settings for returning stylized text snippets with search results, or the web page associated with a search engine may provide an explicit button, radio box, or other UI element allowing the user to select whether stylized text snippets are desired. Alternatively, a search engine may dynamically determine whether the style information should be initially combined with the text snippets based on information associated with either the request or the source of the request. For example, if the search engine determines the search query was received from a mobile client or device, the search engine may not combine the text and style for initial presentation based on processing limitations associated with the specific mobile client or device. Additionally, if the search query was received from a particular type of browser, the search engine may elect not to combine the text and style for initial presentation. In general, the search engine may include instructions detailing in which situations text and style should be initially combined. Various implementations may require or call for different solutions, and various algorithms and determinations may be made for some or all instances of 425. If the search engine determines that the text snippets and style information are to be combined at 425, method 400 continues at 430. If not, method 400 continues at 440.

At 430, the retrieved style information for at least one of the retrieved text snippets is applied and included with the HTML representation of the identified search results. In some instances, applying the style to the text snippets to create the stylized text snippets may comprise applying one or more markup tags to the relevant text snippets. Alternatively, a unique style sheet may be generated by the search engine to define each of the various styles to be included on the results page, with appropriate tags then being applied to the one or more text snippets prior to completion of the results page. Once each of the text snippets to which style information is to be applied is completed, the now-stylized text snippets are inserted into or the appropriate markup language tags are applied to an HTML-based results page. At 435, an updated results page with the identified results (i.e., the particular hyperlinks associated with each of the web pages and documents responsive to the original query) and the associated stylized text snippets is generated, with the updated results page being delivered to the originating device via a responsive transmission. For example, the results page may be sent via an HTTP response message along with the responsive HTML-based results page.

If no stylized text snippets are to be provided with the initial search results, at 440 the identified search results and non-formatted (or generically formatted) text snippets are returned to the originating device via a responsive transmission (e.g., an HTTP response message or the like). In some instances, method 400 may be capable of updating the presented results from generically formatted text snippets to specifically stylized text snippets after the initial presentation of search results. In some instances, the update may used to provide search results faster by first providing a set of generically formatted text snippets, and then, once the correct formatting is applied to each of the text snippets, resending or dynamically updating the presented or returned results. At 445, method 400 determines whether the presented results (of 440) should be updated to include stylized text snippets. If no updated text snippets are to be provided, method 400 returns to 445. However, if method 400 determines that the presented results should be updated to stylized text snippets, method 400 continues at 450.

At 450, the previously retrieved style information is applied to the previously presented text snippets. In some implementations, the updated and stylized text snippets may be generated in the background operations of a web page and provided dynamically to the client as they become ready or complete. In other instances, all text snippets are updated on the backend before any of the presented text snippets are updated from generic to stylized. Alternatively, in some implementations, the originally presented identified search results page may include, but not display, the stylized text snippets. Once a user selection or other event is performed to indicate a need, desire, or instruction to update the presented text snippets, the originally presented and generic text snippets may be automatically and/or simultaneously updated to stylized text snippets. In any event, once the appropriate style information is applied to the previously presented text snippets, the identified results, along with the updated and stylized text snippets, are presented to the client at 460. In some instances, the entire updated results page may be resent by the server to the client, while in others, only the updated portions may be sent to allow the client to perform the update. Additionally, when the stylized text snippets are included with the originally returned search results, but were not initially presented, the browser or client may dynamically update the search results page to reflect the stylized text snippets.

Figure 5:
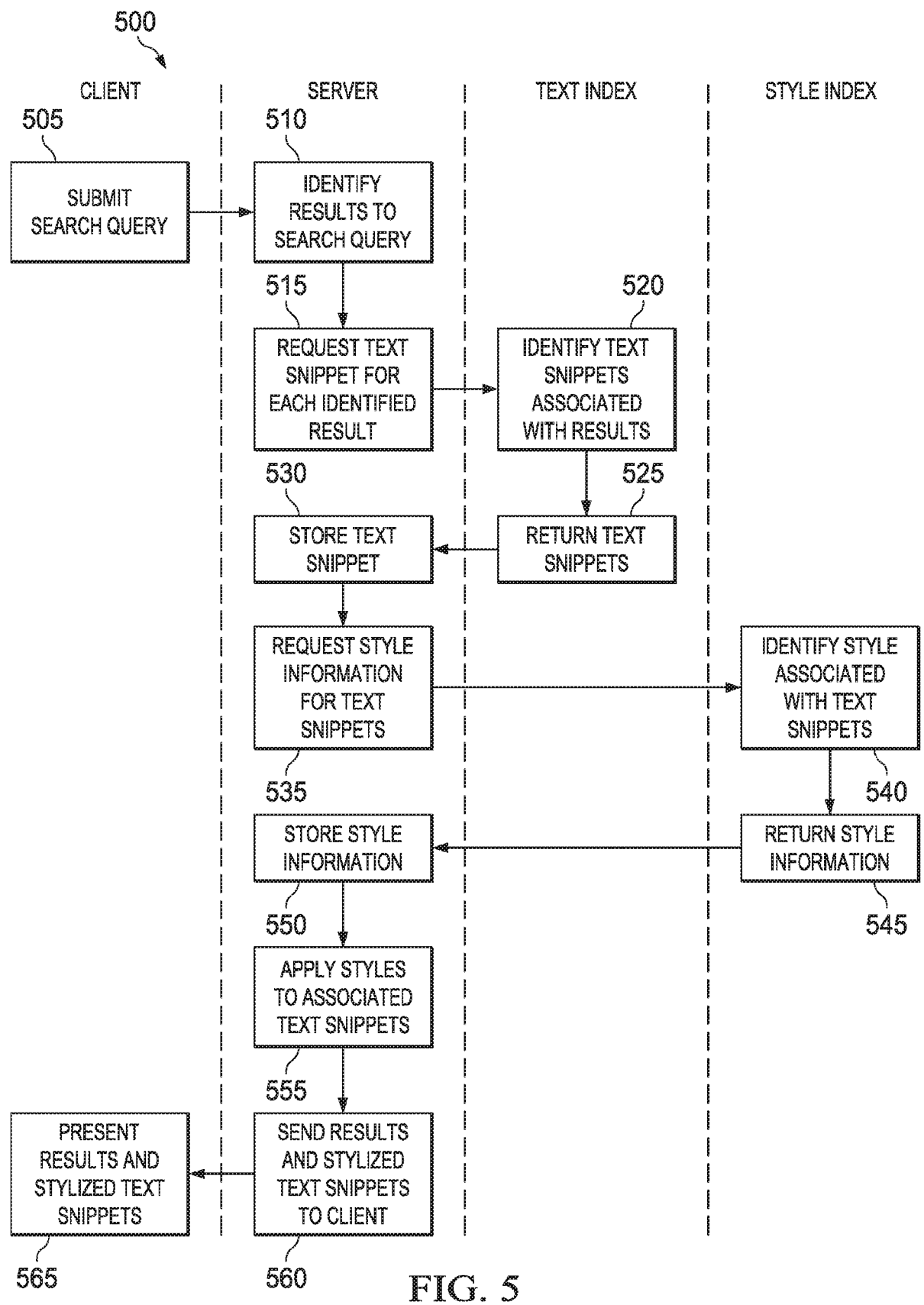
FIG. 5 is an example signaling and flow diagram illustrating operations associated with presenting text snippets and related style information associated with search results returned from a web search query in an example system.

FIG. 5 is an example signaling and flow diagram illustrating operations associated with presenting text snippets and related style information associated with search results returned from a web search query in an example system. Specifically, the system of FIG. 5 illustrates operations across a client, a server, a text index, and a style index. As illustrated in FIG. 5, the text index and style index are listed as separate entities from one another and from the server itself. However, it will be understood that in some implementations, the text index and the style index may be combined into a single index storing both text and style information. Additionally, one or both of the text index and the style index may be stored on the server identified in FIG. 5, while in some instances, one or both of the indices may be stored at a location external to the illustrated server. Still further, one or more of the operations associated with the server may be associated with or performed by a search engine located at or associated with the server. Although certain operations are illustrated as associated with a particular element, any suitable combination of elements and operations may be used to perform the operations described.

Beginning at box 505, the client sends a search query to the server. In some instances, and as described above with regard to systems 100 and 200, the client may use a web browser communicating with a search engine located at the server (via a web interface for the search engine) to send the search query. At box 510, the server (or the search engine associated with the server) identifies one or more results responsive to the search query. In some instances, the results may be based upon previous analysis and page ranking algorithms associated with the search engine, as well as with consideration of previous search requests and interactions performed by the client (or a user profile associated with the client).

At box 515, the server requests a text snippet (or set of text snippets) associated with each of the identified search results from the text index. In general, the request of box 515 is directed to a text index containing at least a portion of the text and content retrieved from and included in a particular web page or web-addressable document identified at box 510. In some instances, the text index may be located internal or local to the server, while in other instances, the text index may be located external to or remote from the server. The request of box 515 may send information defining the identified results to the search query returned at box 510 along with the particular words and phrases used submitted with the search query at box 505.

At box 520, the text index identifies one or more text snippets associated with the identified search results and search query terms and phrases. In some instances, the text of a particular search result is reviewed for the search query terms and phrases identified in the original search query, and one or more portions of text (or text snippets) from the particular search result is identified that includes or relates to the search query terms and phrases. In some instances, a single sentence (whole or a portion) may be selected, while in other instances, a plurality of sentences or portions thereof may be identified. Generally, the text snippet identified may be able to provide some context to the user of where at least some of the search terms submitted with the search query are included or located in the identified search result. At box 525, the text index returns the identified text snippets to the server for processing and storing. In some instances, a search engine application or search engine system associated with the server may be the component that accesses the text index to identify the relevant text snippets. In other instances, the text index may include or be associated with software or other components that receive the request from box 515 and perform the text snippet identification operations separate from the search engine.

At box 530, the server receives the text snippet from the text index and stores it locally. In some instances, the received text snippets can be stored in temporary memory at the server, and maintained only until the finalized list of results and stylized text snippets is returned to the client. In other instance, particularly where the text index is a component within the server, the server may merely identify and store the location and parameters associated with the text snippet and the text index, allowing the server to retrieve the text snippets just before they are needed. In still other instances, regardless of where the text index is stored, the relevant text snippets may still be stored separately in a temporary or other memory, as well as memory remote from the server.

At box 535, the server requests the style information associated with each of the identified and returned text snippets. As illustrated in FIG. 5, the request is generally directed to a style index containing the style information associated with the text of the text index. As previously explained, in some instances the text index and the style index may be combined as a single index, allowing the style information to be obtained simultaneously or concurrently with the text snippets. The request of box 535 may send information identifying the particular text snippets for which style information is requested to the style index. In some instances, this information may define unique identifiers associating particular portions of the text snippets with one or more styles defined in the style index. By doing so, the style index may quickly identify, access, and return the proper style information to the server.

At box 540, the style index receives the request for style information, along with the identifying information associated with the particular text snippets. Further, the style index identifies the style or styles associated with the identified text snippets. In some instances, and as described above, this may include matching one or more identifiers provided by the server (and associated with a particular portion of a text snippet) with entries in a database, table, or other indexing component of the style index to retrieve the appropriate style information to apply to the various text snippets. Any suitable method of identifying the appropriate style information may be used. Further, in some instances, the server, instead of retrieving style information from a style index, may visit the actual web page or web-addressable document from the identified results to retrieve any appropriate style information. Still further, the text snippet at the web page or web-addressable document may be identified using any appropriate technique or process, and a screenshot of the actual text snippet in context may be taken and retrieved. In some instances, this option may be used where style information has not yet been identified or retrieved by a search engine associated with the server, and no other style information is available. At box 545, the style index (or a search engine or other component retrieving information from the style index) returns the identified style information back to the server for storing and further processing.

At box 550, the server receives and stores the style information returned by the style index. In some instances, the style information is stored in temporary storage, where it may be linked or associated with the particular text snippet or snippets with which it is intended. In some instances, this may include adding a new entry or identifier to a temporary table or file storing the text snippets that identifies which style is to be applied, while in other instances it may include adding the style information into a table storing each of the text snippets, where the style information is added to each particular record or entry of the various text snippets. Regardless, the style information is stored and associated with the appropriate text snippets at box 550.

At box 555, the server, or a search engine or other component associated with the server, applies the stored style information to each of the associated text snippets to generate the stylized text snippets that are to be returned, along with the identified search results, to the client. In some instances, applying the style information to the associated text snippets may include adding markup tags to the text snippets in an HTML-based search results page as appropriate, including by generating a dynamically created CSS document describing each individual type of text and style formatting associated with the various text snippets. Still further, where screenshots or other images are used in place of the stylized text snippets, links to or copies of those screenshots/images are placed into the response search results page for sending to the client. In general, the originally-returned text snippets are transformed into stylized text snippets for use or inclusion in the search results page. At box 560, the identified search results and stylized search snippets, generally in a single HTML or other markup-type document, are sent to the client for presentation.

At box 565, the results to the original search query of box 505 are presented at the client, complete with both a list of hyperlinks to one or more web pages and/or web-addressable documents responsive to the search query, along with the stylized text snippets representing relevant portions of the web pages or web-addressable documents to which they pertain. In some instances, the stylized text snippets may be initially hidden in the presentation, available only after an affirmative client action, such as a mouse-over of the search results or a selection/activation of a radio button, checkbox, or other UI element.

Figure 6A:
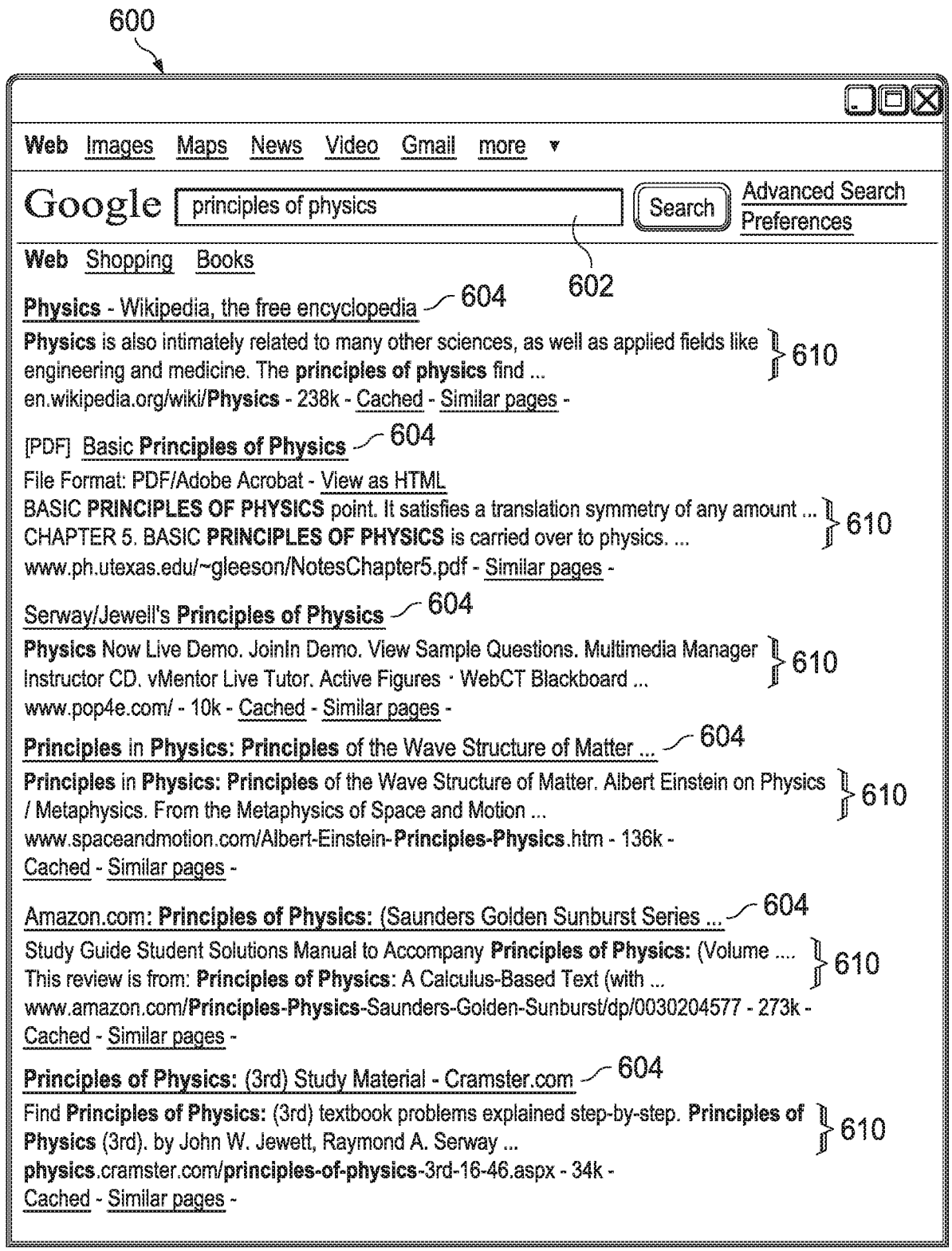
FIG. 6A is an example screenshot of a search results page presented without stylized search snippets.
Figure 6B:
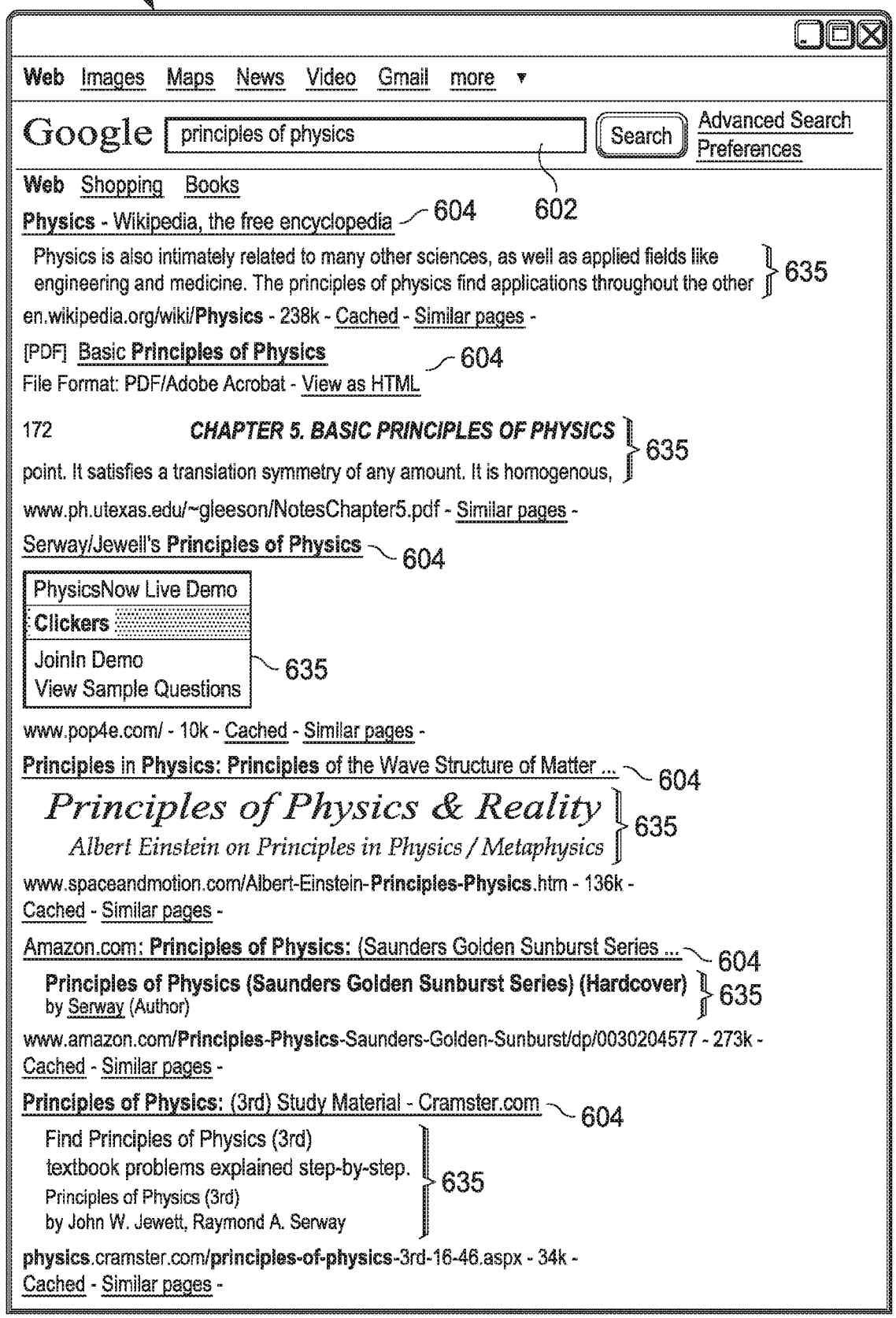
FIG. 6B is an example screenshot of a search results page presented with stylized search snippets.

FIG. 6A is an example screenshot of a search results page 600 presented without stylized search snippets, and FIG. 6B is an example screenshot of a search results page presented with stylized search snippets 630. As shown, FIG. 6A illustrates an example of a search results page with generically-styled text snippets, while FIG. 6B illustrates an example of a search results page including stylized search snippets according to one implementation of the present disclosure. In both of the illustrated examples, the identified results and text snippets are represented as entries from the results page associated with a search using the Google™ search engine at www.google.com. It will be understood that any appropriate search engine can be used with the present disclosure to produce stylized search results.

As shown in FIG. 6A, the defined search terms 602 are shown as "principles of physics." As illustrated by the results page, the search term 602 has already been submitted to the search engine and the list of search results 604 (i.e., web pages and web-addressable documents determined to provide the most relevant response to the phrase "principles of physics") is shown. As examples, responsive documents from various locations have been identified. In FIG. 6A, the search results 604 are provided along with generically-styled text snippets 610 that include, in this example, a bold text to the text snippet representing where the search term 602 or a portion thereof is found (e.g., the terms "principles of physics," "physics," and "principles" are bolded in different sections of the illustrated results). As illustrated, very little, other than a simple textual context for the search terms 602 within an unidentified section of the identified result, is provided. Without clicking on the corresponding hyperlink, little knowledge as to the emphasis of a particular search term or the relevance thereof can be determined.

FIG. 6B depicts an example 630 of search results with stylized search snippets. Again, the defined search terms 602 are "principles of physics," with the identical set of search results presented to the client. In this illustration, however, the native style associated with the particular text snippets has been added to the search results list, thus providing each search result 604 with a stylized text snippet 635 that clearly illustrates the visual and textual context in which the search terms 602 are represented. For example, the second result, an Adobe PDF file, shows that the search term "principles of physics" is located at the beginning of an entire chapter entitled "Basic Principles of Physics," thus providing the client (and/or a user associated therewith) with a clear understanding that the search term "principles of physics" is likely well-satisfied by this result. Additionally, a review of the other stylized text snippets 635 illustrates various levels of visual emphasis and textual location that can assist the user in determining which links or documents to open in response to the query.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions tangibly stored on a computer readable storage device for execution by, or to control the operation of, data processing apparatus. In addition, the one or more computer program products can be tangibly encoded in a propagated signal, which is an artificially generated signal, e.g., a machine-generated electrical, optical, or electromagnetic signal, that is generated to encode information for transmission to suitable receiver apparatus for execution by a computer. The computer readable storage device can be a machine-readable storage device, a machine-readable storage substrate, a memory device, or a combination of one or more of them.

The terms "processor" and "data processing apparatus" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a cross-platform runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other.

While this specification contains many implementation details, these should not be construed as limitations on the scope of any invention or of what may be claimed, but rather as descriptions of features specific to particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of embodiments of the present disclosure have been described. Nevertheless, it will be understood that various modifications may be made without departing from the spirit and scope of the present disclosure. For example, various forms of the flows shown above may be used, with steps added or removed to those illustrated, as well as steps or operations that are performed concurrently with each other or in a different sequential order than that illustrated. Also, although several types of search engine applications have been described, any appropriate search engine application is contemplated in the present disclosure. Accordingly, other implementations are within the scope of the following claims.

What is claimed is:

1. A computer-implemented method comprising:
receiving, from a first client device and by a search server, a first search query entered using a first search application of the first client device, the first search query including one or more terms;
identifying, by the search server, first search results responsive to the first search query;
determining, by the search server, that stylized text snippets are to be provided for one or more of the first search results, the determining being based at least in part on a first application environment of the first client device comprising a first type of browser;
in response to determining that stylized text snippets are to be provided for one or more of the first search results, (i) applying, for at least one first search result of the one or more first search results, style information to a first unstylized text snippet associated with the at least one first search result, wherein the style information is associated with a native context of at least a portion of a first web page associated the first search result, and (ii) transmitting, from the search server for receipt by the first client device, a first stylized text snippet for presentation with the at least one first search result at the first search application of the first client device;
receiving, from a second client device and by the search server, a second search query entered using a second search application of the second client device, the second search query including the one or more terms;
identifying, by the search server, second search results responsive to the second search query;

determining, by the search server, that stylized text snippets are not to be provided for the second search results, the determining being based at least in part on a second application environment of the second client device comprising a second type of browser, wherein the second type of browser differs from the first type of browser;

in response to determining that stylized text snippets are not to be provided for the second search results, transmitting, from the search server for receipt by the second client device, for at least one second search result of the one or more second search results, a second unstylized text snippet associated with the at least one second search result, for presentation with the at least one second search result at the second search application of the second client device;

updating the second unstylized text snippet associated with the at least one second search result to an updated stylized text associated with the at least one second search result, wherein the updated stylized text is based on a native format of at least a portion of a second web page associated the at least one second search result; and in response to determining that the second unstylized text snippet was updated to the stylized text associated with the at least one second search result, transmitting, from the search server for receipt by the second client device, the updated stylized text for presentation at the second client device.

2. The computer-implemented method of claim 1, wherein the first application environment of the first client device and the second application environment of the second client device include data describing respective web browsers executed by each client device for rendering search engine web pages provided by the search server.

3. The computer-implemented method of claim 1, wherein the first application environment of the first client device and the second application environment of the second client device include data describing respective client device types of each client device.

4. The computer-implemented method of claim 3, wherein the first client device and the second client device are different types of devices.

5. The computer-implemented method of claim 1, further comprising:
determining that stylized text snippets are to be subsequently provided for one or more of the second search results;
applying, by the search server, style information to the second unstylized text snippet; and
transmitting, from the search server for receipt by the second client device, a second stylized text snippet for presentation with the at least one second search result at the second search application of the second device.

6. The computer-implemented method of claim 5, wherein the second stylized text snippet is transmitted after the second unstylized text snippet has been presented with the at least one second search result at the second search application of the second client device.

7. The computer-implemented method of claim 5, wherein the second stylized text snippet is presented with the at least one second search result at the second search application in response to a user interaction with the second search application of the second client device.

8. The computer-implemented method of claim 1, wherein applying style information to the first unstylized text snippet associated with the at least one first search result includes:
identifying a web-addressable document that corresponds to the at least one first search result;
selecting the first unstylized text snippet from a text index associated with the web-addressable document, the first unstylized text snippet being a portion of text from the web-addressable document that includes at least one of the one or more terms;
retrieving, from a style index, the style information associated with the portion of text from the web-addressable document, wherein the style information specifies display formatting for the portion of text within the web-addressable document; and
applying the retrieved style information to the first unstylized text snippet.

9. The computer-implemented method of claim 8, wherein the first search result includes a hyperlink to the corresponding web-addressable document, and the first stylized text snippet is stylized such that it appears in the first search application of the first client device as the portion of text appears in the web-addressable document.

10. A non-transitory computer readable storage medium, the computer readable storage medium storing instructions for causing one or more processors to perform operations comprising:
receiving, from a first client device and by a search server, a first search query entered using a first search application of the first client device, the first search query including one or more terms;
identifying, by the search server, first search results responsive to the first search query;
determining, by the search server, that stylized text snippets are to be provided for one or more of the first search results, the determining being based at least in part on a first application environment of the first client device comprising a first type of browser;
in response to determining that stylized text snippets are to be provided for one or more of the first search results, (i) applying, for at least one first search result of the one or more first search results, style information to a first unstylized text snippet associated with the at least one first search result, wherein the style information is associated with a native context of at least a portion of a first web page associated the first search result, and (ii) transmitting, from the search server for receipt by the first client device, a first stylized text snippet for presentation with the at least one first search result at the first search application of the first client device;
receiving, from a second client device and by the search server, a second search query entered using a second search application of the second client device, the second search query including the one or more terms;
identifying, by the search server, second search results responsive to the second search query;
determining, by the search server, that stylized text snippets are not to be provided for the second search results, the determining being based at least in part on a second application environment of the second client device comprising a second type of browser, wherein the second type of browser differs from the first type of browser;
in response to determining that stylized text snippets are not to be provided for the second search results, transmitting, from the search server for receipt by the second client device, for at least one second search result of the one or more second search results, a second unstylized text snippet associated with the at least one second search result, for presentation with the at least one second search result at the second search application of the second client device;

updating the second unstylized text snippet associated with the at least one second search result to an updated stylized text associated with the at least one second search result, wherein the updated stylized text is based on a native format of at least a portion of a second web page associated the at least one second search result; and in response to determining that the second unstylized text snippet was updated to the stylized text associated with the at least one second search result, transmitting, from the search server for receipt by the second client device, the updated stylized text for presentation at the second client device.

11. The non-transitory computer readable storage medium of claim 10, the operations further comprising:
determining that stylized text snippets are to be subsequently provided for one or more of the second search results;
applying, by the search server, style information to the second unstylized text snippet; and
transmitting, from the search server for receipt by the second client device, a second stylized text snippet for presentation with the at least one second search result at the second search application of the second device.

12. The non-transitory computer readable storage medium of claim 11, wherein the second stylized text snippet is transmitted after the second unstylized text snippet has been presented with the at least one second search result at the second search application of the second client device.

13. The non-transitory computer readable storage medium of claim 11, wherein the second stylized text snippet is presented with the at least one second search result at the second search application in response to a user interaction with the second search application of the second client device.

14. The non-transitory computer readable storage medium of claim 10, wherein applying style information to the first unstylized text snippet associated with the at least one first search result includes:
identifying a web-addressable document that corresponds to the at least one first search result;
selecting the first unstylized text snippet from a text index associated with the web-addressable document, the first unstylized text snippet being a portion of text from the web-addressable document that includes at least one of the one or more terms;
retrieving, from a style index, the style information associated with the portion of text from the web-addressable document, wherein the style information specifies display formatting for the portion of text within the web-addressable document; and
applying the retrieved style information to the first unstylized text snippet.

15. A system comprising:
one or more servers, the one or more servers including at least one processor, the at least one processor adapted to perform operations comprising:
receiving, from a first client device and by a search server, a first search query entered using a first search application of the first client device, the first search query including one or more terms;
identifying, by the search server, first search results responsive to the first search query;
determining, by the search server, that stylized text snippets are to be provided for one or more of the first search results, the determining being based at least in part on a first application environment of the first client device comprising a first type of browser;
in response to determining that stylized text snippets are to be provided for one or more of the first search results, (i) applying, for at least one first search result of the one or more first search results, style information to a first unstylized text snippet associated with the at least one first search result, wherein the style information is associated with a native context of at least a portion of a first web page associated the first search result, and (ii) transmitting, from the search server for receipt by the first client device, a first stylized text snippet for presentation with the at least one first search result at the first search application of the first client device;
receiving, from a second client device and by the search server, a second search query entered using a second search application of the second client device, the second search query including the one or more terms;
identifying, by the search server, second search results responsive to the second search query;
determining, by the search server, that stylized text snippets are not to be provided for the second search results, the determining being based at least in part on a second application environment of the second client device comprising a second type of browser, wherein the second type of browser differs from the first type of browser;
in response to determining that stylized text snippets are not to be provided for the second search results, transmitting, from the search server for receipt by the second client device, for at least one second search result of the one or more second search results, a second unstylized text snippet associated with the at least one second search result, for presentation with the at least one second search result at the second search application of the second client device;
updating, automatically, the second unstylized text snippet associated with the at least one second search result to an updated stylized text associated with the at least one second search result, wherein the updated stylized text is based on a native format of at least a portion of a second web page associated the at least one second search result; and
in response to determining that the second unstylized text snippet was updated to the stylized text associated with the at least one second search result, transmitting, from the search server for receipt by the second client device, the updated stylized text for presentation at the second client device.

16. The system of claim 15, the operations further comprising:
determining that stylized text snippets are to be subsequently provided for one or more of the second search results;
applying, by the search server, style information to the second unstylized text snippet; and
transmitting, from the search server for receipt by the second client device, a second stylized text snippet for presentation with the at least one second search result at the second search application of the second device.

17. The system of claim 16, wherein the second stylized text snippet is transmitted after the second unstylized text snippet has been presented with the at least one second search result at the second search application of the second client device.

18. The system of claim 16, wherein the second stylized text snippet is presented with the at least one second search result at the second search application in response to a user interaction with the second search application of the second client device.

19. The system of claim 15, wherein applying style information to the first unstylized text snippet associated with the at least one first search result includes:

identifying a web-addressable document that corresponds to the at least one first search result;

selecting the first unstylized text snippet from a text index associated with the web-addressable document, the first unstylized text snippet being a portion of text from the web-addressable document that includes at least one of the one or more terms;

retrieving, from a style index, the style information associated with the portion of text from the web-addressable document, wherein the style information specifies display formatting for the portion of text within the web-addressable document; and applying the retrieved style information to the first unstylized text snippet.

* * * * *